US007454450B2

(12) United States Patent
Remy et al.

(10) Patent No.: US 7,454,450 B2
(45) Date of Patent: Nov. 18, 2008

(54) MIXED-SIGNAL SYSTEM FOR PERFORMING TAYLOR SERIES FUNCTION APPROXIMATIONS

(75) Inventors: Brian Remy, Houston, TX (US); Michael D. Bryant, Austin, TX (US); Benito R. Fernandez, Austin, TX (US); Shouli Yan, Austin, TX (US)

(73) Assignee: The Board of regents, The University of Texas System, Austin, TX (US)

( * ) Notice: Subject to any disclaimer, the term of this patent is extended or adjusted under 35 U.S.C. 154(b) by 0 days.

(21) Appl. No.: 11/955,006

(22) Filed: Dec. 12, 2007

(65) Prior Publication Data

US 2008/0140755 A1 Jun. 12, 2008

Related U.S. Application Data

(60) Provisional application No. 60/869,688, filed on Dec. 12, 2006.

(51) Int. Cl.
*G06F 7/52* (2006.01)
*G06F 15/00* (2006.01)

(52) U.S. Cl. ...................................... 708/103; 708/200

(58) Field of Classification Search ................. 708/100, 708/200–209, 103
See application file for complete search history.

(56) References Cited

U.S. PATENT DOCUMENTS 5,327,137 A * 7/1994 Scheerer et al. ............. 341/168
2004/0010532 A1* 1/2004 Lu ............................ 708/512
2007/0007929 A1* 1/2007 Lee et al. .................... 318/802

OTHER PUBLICATIONS

Carlen, Topic: Taylor's Theorem with Several Variables, Apr. 4, 2004, pp. 1-13, http://www.math.gatech.edu/~carlen/2507/notes/Taylor.html.*

* cited by examiner

*Primary Examiner*—Chat C Do
(74) *Attorney, Agent, or Firm*—Antony P. Ng; Dillon & Yudell LLP

(57) ABSTRACT

A mixed-signal system for performing Taylor series function approximations is disclosed. The mixed-signal system includes a digital-to-analog converter (DAC), multiple resistor-to-resistor (R2R) ladders, various digital registers, a digital processor and an analog integrator. The digital processor calculates coefficients F, $F_x$, $F_y$, $F_{xx}$, $F_{xy}$, $F_{yy}$ of a Taylor series equation and calculates distance functions. The digital processor also includes a digital register for storing a magnitude scaling factor $\phi(x_0,y_0)$ of the Taylor series equation. The DAC control register uploads a lead term $F(x_0,y_0)$ of the Taylor series equation from the digital processor to the DAC. The first-order digital registers controls resistances of the R2R ladders. The second-order digital registers uploads coefficients $F_x$, $F_y$, $F_{xx}$, $F_{xy}$, $F_{yy}$ of the Taylor series equation from the digital processor to the DAC. The analog integrator adds outputs from the DAC and the R2R ladder to generate approximation results for the Taylor series equation.

7 Claims, 2 Drawing Sheets

MIXED-SIGNAL SYSTEM FOR PERFORMING TAYLOR SERIES FUNCTION APPROXIMATIONS

PRIORITY CLAIM

The present application claims priority under 35 U.S.C. § 119(e)(1) to provisional application No. 60/869,688 filed on Dec. 12, 2006, the contents of which are incorporated herein by reference.

BACKGROUND OF THE INVENTION

1. Technical Field

The present invention relates to data processing in general, and in particular to an apparatus for performing non-linear functions. Still more particularly, the present invention relates to a mixed-signal system for performing Taylor series function approximations.

2. Description of Related Art

Although differential equations having strong non-linearities can be solved by using digital computers, they can only be performed at a relatively slow speed because strong non-linearities tend to render numerical algorithms for solving differential equations "stiff," which often demand smaller time steps. On the other hand, analog computers can process signals almost instantaneously, but analog computers have been limited to non-linear functions (such as multiplications, logarithms, sinusoids, and exponentials) that can be synthesized by conventional analog components. In addition, the range of values over which non-linear functions can be synthesized has been severely limited by the saturation of analog components. Thus, any implementations of non-linear functions with analog components have been restricted to specific non-linear functions over a relatively limited range of values.

Artificial neural networks (ANN) and fuzzy logic systems have been utilized to perform analog function approximations. ANNs can typically be trained to approximate analog functions. Fuzzy logic systems typically incorporate a rule-based approach to the solving of a control problem instead of attempting to model a system mathematically. But even though approximation methods using fuzzy logic systems show some promising results in performing analog function approximations, they are still hampered by the saturation of analog circuits.

Consequently, it would be desirable to provide an improved apparatus capable of performing non-linear function approximations over a wide range of values.

SUMMARY OF THE INVENTION

In accordance with a preferred embodiment of the present invention, a mixed-signal system for performing Taylor series function approximations includes a digital-to-analog converter (DAC), multiple resistor-to-resistor (R2R) ladders, various digital registers, a digital processor and an analog integrator (or an operational amplifier). The digital processor calculates coefficients F, $F_x$, $F_y$, $F_{xx}$, $F_{xy}$, $F_{yy}$ of a Taylor series equation and calculates distance functions. The digital processor also includes a digital register for storing a magnitude scaling factor $\phi(x_0,y_0)$ of the Taylor series equation. The DAC control register uploads a lead term $F(x_0,y_0)$ of the Taylor series equation from the digital processor to the DAC. The first-order digital registers controls resistances of the R2R ladders. The second-order digital registers uploads coefficients $F_x$, $F_y$, $F_{xx}$, $F_{xy}$, $F_{yy}$ of the Taylor series equation from the digital processor to the DAC and first-order control registers. The analog integrator (or an operational amplifier) adds outputs from the DAC and the R2R ladder to generate approximation results for the Taylor series equation.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
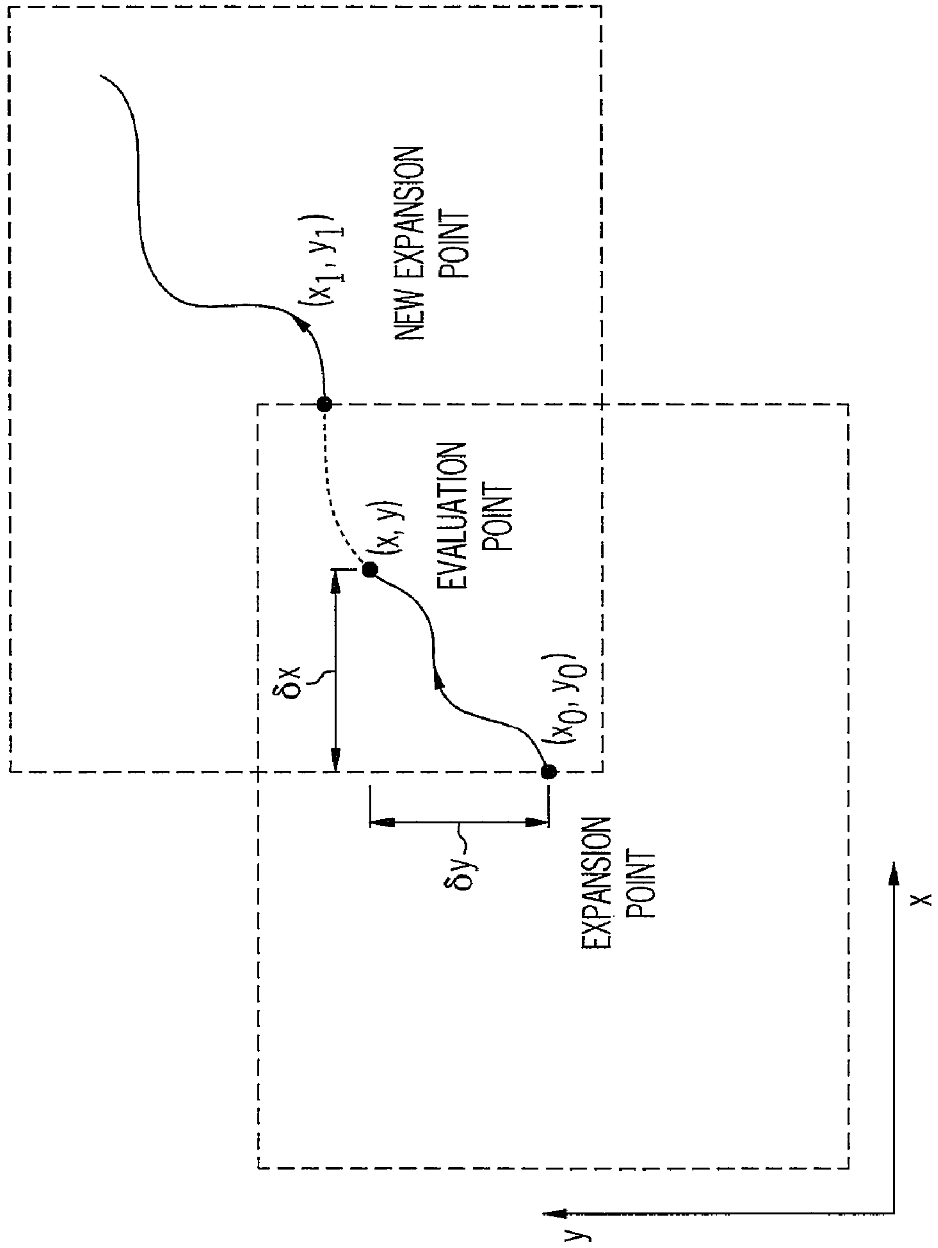
FIG. 1 is a diagram illustrating a Taylor series approximation with a moving expansion point in two dimensions.

The present invention provides an apparatus for synthesizing any arbitrary, piecewise continuous function in an analog domain that is defined over an arbitrary N-dimensional space. The present invention allows a Taylor series function approximation to be implemented with both analog and digital components.

A Taylor series expands a function $f(x)$ in a series about a point $x_0$. In one dimension, a general Taylor series approximation can be written as $$f(x) = 2^{\phi(x_0)}F(x) \tag{1}$$

$$F(x) = F(x_0) + F'(x_0)\delta x + \frac{1}{2!}F''(x_0)\delta x^2 + \frac{1}{3!}F'''(x_0)\delta x^3 + \ldots + \frac{1}{n!}F^n(x_0)\delta x^n + O(\delta x^{n+1}) \tag{1a}$$

$$O(\delta x^{n+1}) = \sum_{k=n+1}^{\infty} \frac{1}{k!}F^k(x_0)\delta x^k \tag{1b}$$

where $x_0$ is the expansion point about which the Taylor series is taken, $\phi(x_0)$ is an integer exponent for order of magnitude scaling of the Taylor series chosen such that F(x) in equation (1a) is of order one;

$$F'(x_0) = \left.\frac{dF}{dx}\right|_{x=x_0},$$

$$F^k(x_0) = \left.\frac{d^kF}{dx^k}\right|_{x=x_0},$$

and $dx=x-x_0$ is the distance between the approximation point x and the expansion point $x_0$. The integer n in equations (1a) and (1b) represents the order of the Taylor series, and O(·) is "order of." A multi-dimensional Taylor series can be written as $$f(\underline{x}) = \left[F(\underline{x_0}) + \sum_{k=1}^{r}\left[\frac{1}{k!}\left(\sum_{i=1}^{N}\delta x_i\frac{\partial}{\partial x_i}\right)^k F(\underline{x_0})\right] + R_r(\underline{x})\right]2^{\phi(x_0)} \tag{2}$$

where $\delta x_i = x_i - x_{0i}$ extends from vector $x=[x_i]$ marking the evaluation point for the function to the expansion point $x_0=[x_{0i}]$, where notation $[x_i]$ refers to components $x_i$, i=1, 2, . . . , N, of N dimension vector x. Vectors x, $x_0$, and δx have N components. The accuracy of the series diminishes with increased distance |δx| from the expansion point $x_0$. The error $$R_r(x) = \sum_{k=r+1}^{\infty}\left[\frac{1}{k!}\left(\sum_{i=1}^{N}\delta x_i\frac{\partial}{\partial x_i}\right)^k F(\underline{x_0})\right]$$

is in the order of $O(\delta x_i^{r+1})$, where r is the order of the approximation. The approximation is accurate if the distance δx can be kept sufficiently small. If exact function values for the Taylor series coefficients $\phi(x_0)$, $F(x_0)$, $F'(x_0)$, $F''(x_0)/2!$, $\partial F/\partial x_i$, etc. at points $x_k$ distributed through the domain of x are known, the function can be accurately approximated throughout the domain by judiciously moving the expansion to other points $x_k$, thus keeping δx small. However, the Taylor series coefficients must be recalculated at the new points.

With a mixed-signal system, analog components along with digital components can perform the operations of equations (1) or (2), and the digital components can simultaneously calculate the Taylor series constants. The above-mentioned approach uses a lower-order Taylor series approximation with frequent shifts of the expansion point $x_o$ to maintain accuracy. Equations (1) and (2) are simpler to realize when the order of n or r are relatively small, such as 1 or 2.

Referring now to the drawings and in particular to FIG. 1, there is depicted a diagram illustrating a Taylor series approximation with a moving expansion point in two dimensions. The center of a rectangle 10 represents an initial expansion point $(x_0,y_0)$. The boundaries of rectangle 10 represent the maximum distance $(\delta x^2+\delta y^2)^{1/2}$ between the initial expansion point and the approximation point that can guarantee a desired accuracy. The size of rectangle 10 determines the overall accuracy of the approximation. The smaller rectangles 10 is, the higher the accuracy of the approximation will be.

As point x migrates through the domain, either $\delta x=x-x_0$ or $\delta y=y-y_0$ will reach one of the boundaries. In FIG. 1, the initial expansion point is shifted to an intersection point on that boundary; the intersection point then becomes a new expansion point $(x_1,y_1)$ for a new Taylor series approximation. The Taylor series coefficients must be re-evaluated at new expansion point $(x_1,y_1)$. A new rectangular boundary 11 is placed around new expansion point $(x_1,y_1)$. Local coordinates δx and δy relative to new expansion point $(x_1,y_1)$ are set to zero, and the Taylor series approximation continues about new expansion point $(x_1,y_1)$. The same approach can be applied to functions of N variables, with the rectangle becoming an N-dimensional parallel-piped.

A hardware implementation of a Taylor series expansion should be able to evaluate the Taylor series coefficients at an expansion point, to multiply the Taylor series coefficients by relevant distance functions, and to perform a summation of all the terms. If the expansion point is fixed in the function approximation domain, only the distance functions change values. The hardware should process arbitrary piecewise continuous non-linear functions of the variables, without saturating any operational amplifiers. The variables are real numbers, where digital registers hold the (floating-point) integer part, and the contents of an analog integrator, which can store any real number between −1 and +1, holding the fractional part. For this reason, the analog integrator is known as the "analog bit." The expansion points $x_0$ will be restricted to integer vectors, permitting digital components to evaluate all Taylor series coefficients. The distance functions δx, restricted to a vector of real numbers with all components having magnitude equal to or less than one can be processed by analog components without saturation.

The present approach uses analog bits to process the distance functions δx in an analog domain, a digital processor to evaluate Taylor series coefficients, a digital-to-analog converter to synthesize the lead term $F(x_0)$ in equations (1) and (2) (this digital coefficient will become an analog signal), R2R ladders to synthesize the first order terms in equations (1) and (2) and an analog adder to sum all the signals. To keep distance function δx and errors small, the expansion point $x_0$ must jump from one integer boundary point to another integer boundary point within the analog domain, as shown in FIG. 1. In increments, the expansion point $x_0$ follows x through the analog domain, keeping δx small.

Figure 2:
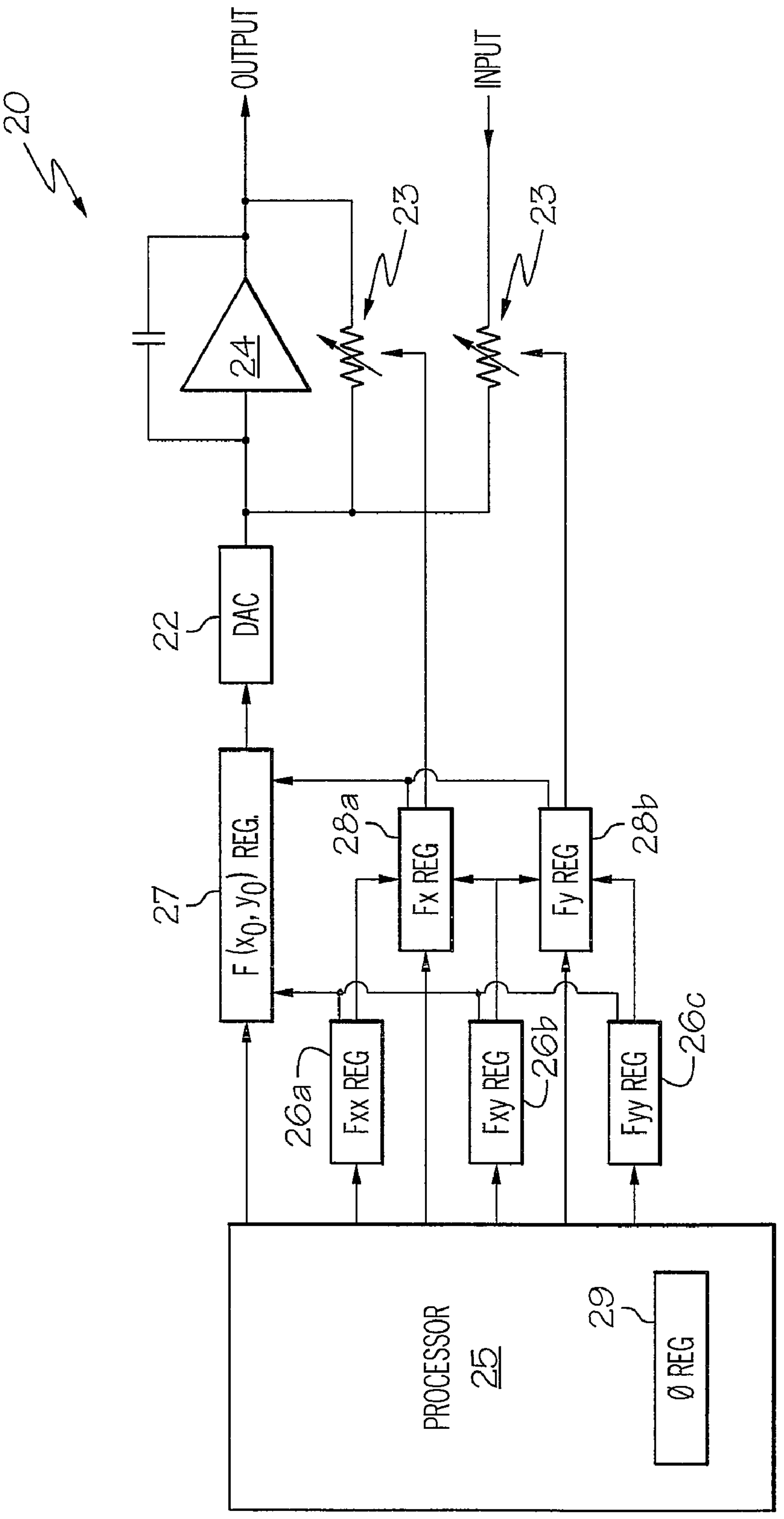
FIG. 2 is a block diagram of a mixed-signal system for performing Taylor series approximations in two variables, in accordance with a preferred embodiment of the present invention.

With reference now to FIG. 2, there is illustrated a mixed-signal system for performing Taylor series approximations in two variables, in accordance with a preferred embodiment of the present invention. As shown, a mixed-signal system 20 includes digital registers 26*a*-26*c*, 27 and 28*a*-28*b*, a digital-to-analog converter (DAC) 22, resistor-to-resistor (R2R) ladders 23, an analog integrator (or operational amplifier) 24, and a digital processor 25. The arrows between components indicate directions of signals. Given expansion point $(x_0,y_0)$ stored in registers as floating-point integers, processor 25 calculates and uploads Taylor series coefficients into digital registers 26*a*-26*c*, 27, 28*a*-28*b* and 29. Digital registers 26*a*-26*c*, 27 and 28*a*-28*b* control DAC 22 and R2R ladders 23 accordingly. Digital register 29 holds the magnitude scaling factor $\phi(x_0,y_0)$. The lead term $F(x_0,y_0)$ of equations (1) or (2) is uploaded to DAC control register 27.

For small distances δx, the lead term $F(x_0,y_0)$ dominates a Taylor series, and thus DAC 22 anchors the accuracy of the function synthesis in the analog domain. DAC 22 and DAC control register ($F(x_0,y_0)$ register) 27 require many bits (e.g., at least 16 bits) to establish approximation accuracy. All other terms are corrections to the lead term $F(x_0,y_0)$. First order terms, such as $F'(x_0)\,\delta x$ in equation (1), are realized by analog integrator 24's analog bit voltage signal δx passing through R2R ladder 23 with resistance set to $F'(x_0)$. Each analog bit signal from analog integrator 24 is multiplied by the value of R2R ladder 23. The resistances of R2R ladders 23 are controlled by digital registers 28*a*-28*b*.

FIG. 2 corresponds to the two variable functions of FIG. 1. As such, there are two first-order $F_x$ and $F_y$ registers 28*a*-28*b* and two R2R ladders 23. Processor 25 uploads first-order Taylor series coefficients $F'(x_0)$ that are integers to digital registers 28*a*-28*b*. Currents from DAC 22 and ladder-scaled analog bits add at the input node of analog integrator 24, instantaneously implementing the sums in equations (1) or (2) in an analog manner.

Second-order Taylor series terms can be included using the remaining hardware in FIG. 2. In equation (1a), since $F(x_0)\,\delta x+½F''(x_0)\,\delta x^2=[F'(x_0)+½F''(x_0)\,\delta x]\,\delta x$, the term $½F''(x_0)\,\delta x$ can be viewed as a correction to the first-order coefficient $F'(x_0)$. For $|\delta x|<1$, this correction is likely small and can be neglected, but whenever $\delta x=\pm 1$, addition or subtraction of $½F''(x_0)$ to the first-order register automatically corrects the first order term to $[F'(x_0)\pm ½F''(x_0)]$. The two variable function approximation of FIG. 2 has three second-order terms that correct the two first-order terms. This correction, being performed digitally with hardwired logic, effectively enlarges the approximation boundary about expansion point $(x_1,y_1)$ in FIG. 1. Processor 25 computes and uploads second-order coefficients to second-order $F_{xx}$, $F_{xy}$, $F_{yy}$ registers 26*a*-26*c*. In a similar manner, first-order digital registers 28*a*-28*b* can correct main digital register 27. Register corrections occur at each analog bit overflow, i.e., whenever $\delta x=\pm 1$.

For a multi-dimensional Taylor series with N variables, the series has N first-order coefficients and terms, and N [(N+1)/2] second-order coefficients and terms. A tradeoff to the enhanced accuracy of second-order corrections is the additional registers and calculations required from processor 25. When the value of a distance function δx reaches one of the rectangular boundaries in FIG. 1, all register values are recalculated, and the Taylor series expansion point relocated. While the digital portion of mixed-signal system 20 calculates new values of coefficients, the analog portion of mixed-signal system 20 continues to implement the Taylor series. If δx, processed by the high bandwidth analog bit moves too fast through the analog domain (see FIG. 1), the smaller bandwidth digital portion of mixed-signal system 20 may not calculate the coefficients within the allotted time, effectively falling behind the analog portion of mixed-signal system 20. A balance must be struck between computation speed and accuracy. Nonetheless, the analog based function approximator should be fast enough compared to all other computer platforms.

As has been described, the present invention provides a mixed-signal system for performing Taylor series function approximations. The mixed-signal system of the present invention approximates arbitrary piecewise continuous nonlinear functions in analog and/or mixed signals. The implementation uses frequent expansion point shifts to bound and insure accuracy of the approximation.

While the invention has been particularly shown and described with reference to a preferred embodiment, it will be understood by those skilled in the art that various changes in form and detail may be made therein without departing from the spirit and scope of the invention.

What is claimed is:

1. A mixed-signal system for performing Taylor series approximations, said system comprising:

a digital processor for calculating coefficients $F_x$, $F_y$, $F_{xx}$, $F_{xy}$, $F_{yy}$ of a Taylor series equation and for calculating distance functions, wherein said digital processor includes a digital register for storing a magnitude scaling factor $\phi(x_0,y_0)$ of said Taylor series equation;

a digital-to-analog converter (DAC) coupled to said digital processor;

a DAC control register, coupled to said DAC, for uploading a lead term $F(x_0,y_0)$ of said Taylor series equation from said digital processor to said DAC;

a plurality of resistor-to-resistor (R2R) ladders coupled to said DAC;

a plurality of first-order digital registers, coupled to said R2R ladders, for controlling resistances of said R2R ladders;

a plurality of second-order digital registers, coupled to said digital processor, for uploading coefficients $F_{xx}$, $F_{xy}$, $F_{yy}$ of said Taylor series equation from said digital processor to said DAC; and an analog integrator or operational amplifier for adding outputs from said DAC and said R2R ladder to generate approximation results for said Taylor series equation.

2. The system of claim 1, wherein said DAC control register sets resistance of said R2R ladders according to said lead term.

3. The system of claim 1, wherein each signal of said analog integrator is multiplied by a value of said R2R ladders.

4. The system of claim 1, wherein first-order terms of said Taylor series equation are realized by said analog integrator's voltage signal δx passing through said R2R ladder having a resistance set to $F'(x_0)$.

5. The system of claim 1, wherein second-order terms of said Taylor series equation are realized by corrections to said DAC and said R2R ladder by said DAC control register, said R2R control registers, and said second-order digital registers.

6. The system of claim 1, wherein said Taylor series equation is scaled in order of magnitude by an exponent.

7. The system of claim 1, wherein said analog integrator is an operational amplifier.

* * * * *